June 8, 1937.   A. H. R. FEDDEN ET AL   2,083,439
AIRSCREW
Filed July 31, 1935   2 Sheets-Sheet 1
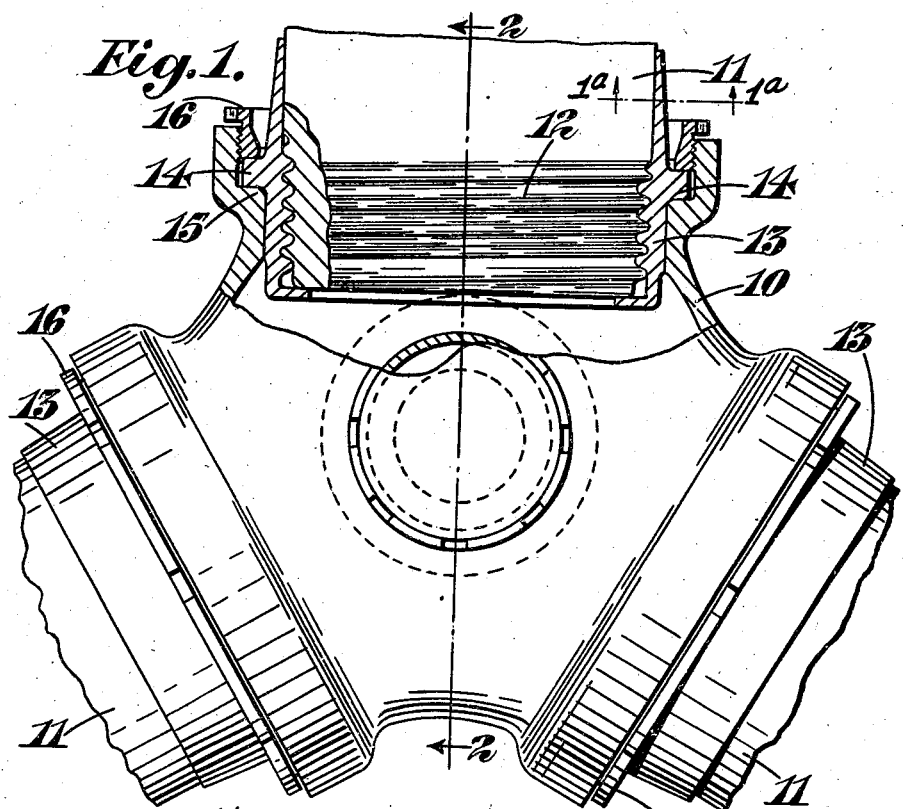
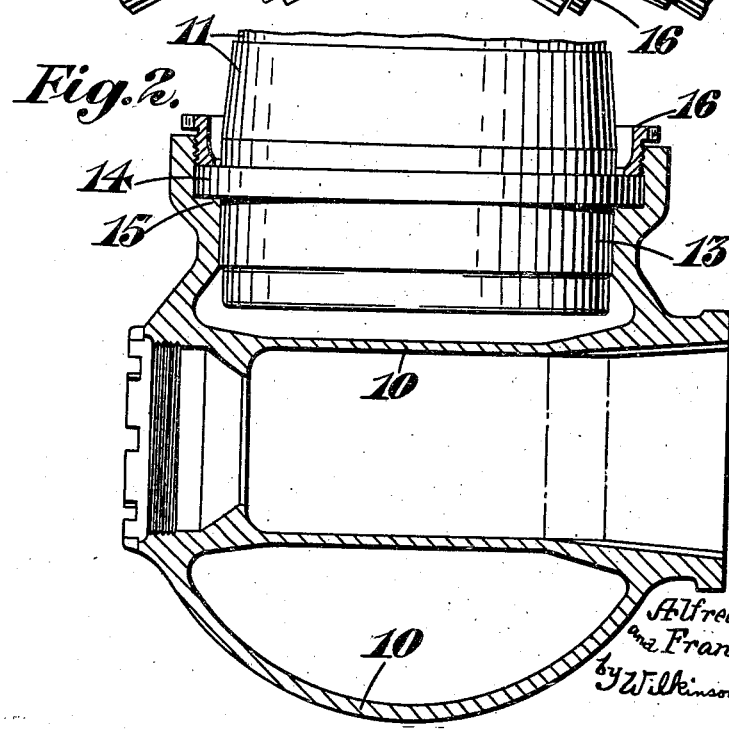
Inventors
Alfred H. R. Fedden
and Frank M. Owner
by Wilkinson & Mawhinney
Attorneys June 8, 1937.  A. H. R. FEDDEN ET AL  2,083,439
AIRSCREW
Filed July 31, 1935   2 Sheets-Sheet 2
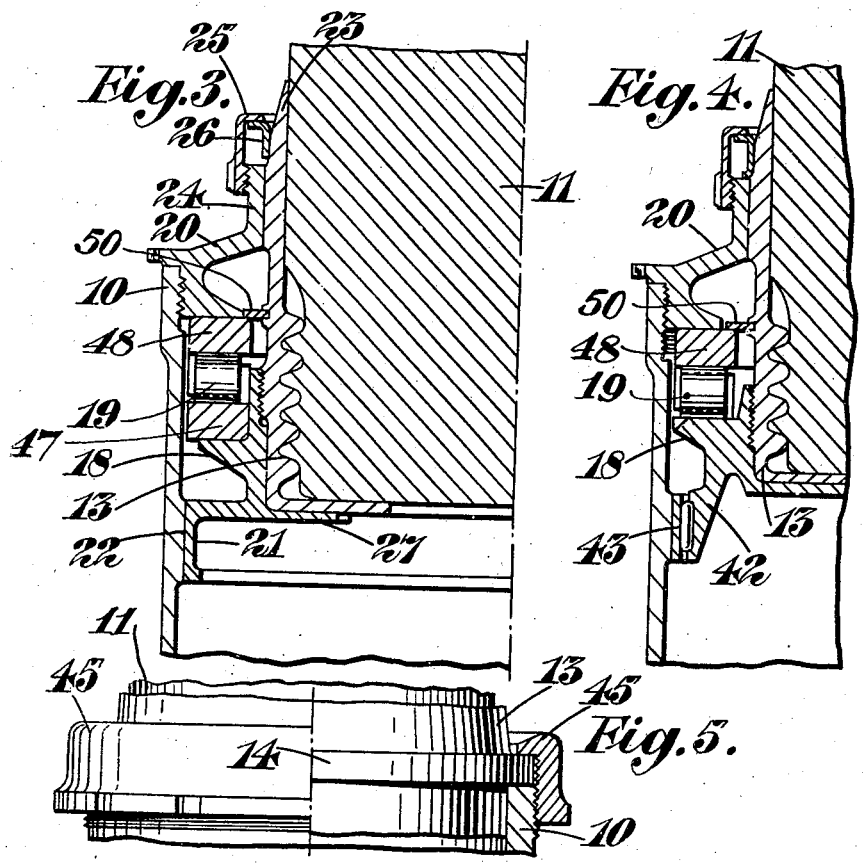
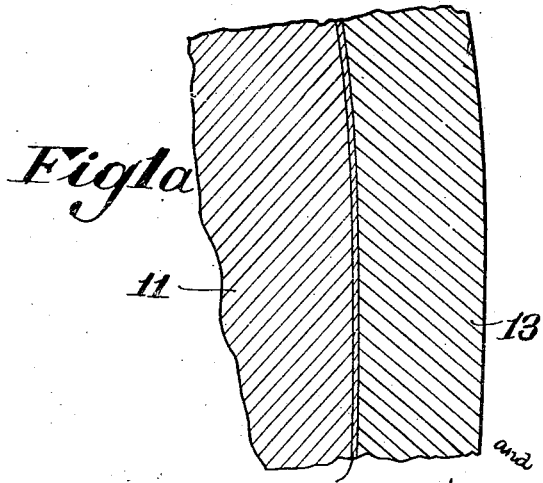
Inventors
Alfred H. R. Fedden
and Frank M. Owner
by Wilkinson & Mawhinney
Attorneys.

Patented June 8, 1937

2,083,439

UNITED STATES PATENT OFFICE 2,083,439

AIRSCREW

Alfred Hubert Roy Fedden and Frank Morgan Owner, Bristol, England, assignors to The Bristol Aeroplane Company, Limited, Bristol, England, a British company Application July 31, 1935, Serial No. 34,084
In Great Britain September 21, 1934

4 Claims. (Cl. 170—173)

This invention is for improvements in or relating to airscrews for aircraft and has for its object to provide an improved construction for the root of a metal airscrew blade whereby such blades are rendered more suitable for use in adjustable-pitch and variable-pitch airscrews. The term "adjustable-pitch airscrew", as used herein, means an airscrew, the blade-pitch of which may be set to a desired value when the aircraft is on the ground and the airscrew is stationary, but cannot be adjusted during flight. The expression "variable-pitch airscrew", as used herein, means an airscrew of which the blade-pitch can be varied while the airscrew is rotating.

In an adjustable-pitch or variable-pitch airscrew in which the airscrew blades are of a comparatively soft metal such as a magnesium alloy or aluminium alloy, it is necessary to provide reinforcement at the root of the blade for the stresses to which the blade is subjected. According to the present invention, an airscrew blade of comparatively soft metal has a sleeve of harder metal screw-threaded and shrunk on to the blade-root in such manner that the sleeve grips the root over the whole of the co-operating screw-threads.

According to another feature of the invention, a detachable flange is provided (e. g. on an outer sleeve) surrounding the sleeve to constitute an abutment for a thrust bearing within the airscrew hub. An airscrew-blade as set out above may comprise a coating on one or both of the inter-engaging surfaces of a thin layer of soft material to prevent fretting between the surfaces.

Specific embodiments of the present invention will now be described, by way of example, with reference to the accompanying drawings, of which:—

Figure 1 is an elevation, partly in section, of a three-bladed adjustable-pitch airscrew hub showing the root portions of the blades;

Figure 1a is a section of a portion of the airscrew blade and its surrounding sleeve, drawn to a greatly enlarged scale, the section being taken on the line 1a—1a of Figure 1;

Figure 2 is a sectional elevation on the line 2—2 of Figure 1 with certain parts omitted;

Figure 3 is a sectional elevation of part of the blade-root and part of the hub of a variable-pitch airscrew according to the invention;

Figure 4 shows an alternative form of Figure 3, and

Figure 5 shows an alternative form of blade-retaining nut.

As shown first in Figures 1 and 2, the hub 10 of the airscrew is of one-piece construction, as opposed to the known form of split hub comprising two halves clamped together to embrace the shanks of the blades. Each of the airscrew blades 11 is of magnesium alloy having the following composition:—

|  | Percent |
| --- | --- |
| Aluminium—not more than | 10 |
| Zinc—not more than | 1.5 |
| Manganese—not more than | 1 |
| Impurities—not more than | 1.5 |
| Magnesium—the remainder. | |

Alternatively, the blade may be composed of an alloy in which aluminium predominates.

The inner end of each blade 11 is screw-threaded as shown at 12 and is engaged by a sleeve 13 of comparatively hard steel alloy. The steel sleeve is screw-threaded and shrunk on to the blade. The diameter of the screw-threads in the sleeve 13 is somewhat less than the diameter of the screw-threads on the blade 11 prior to assembly. The sleeve is heated, and thereby caused to expand, and is screwed on to the root of the blade while still hot. When the sleeve cools, the blade is tightly gripped by a shrink fit over the whole of the co-operating screw-threads. The expression "shrink fit" as herein used means the grip obtained by differential heating of the two parts.

Where the blade is composed of the magnesium alloy above-specified, a suitable diameter for the inside of the sleeve, when cold, is found to be .001", per inch of diameter, less than the external diameter of the blade threads.

The threads are formed to constant dimensions on each part and may be so designed that the radius of curvature at the bottom of the thread on the blade is greater than the radius at the bottom of the thread on the sleeve, which is of harder metal.

It will be seen that the end of the sleeve is tapered; this tapered end also tightly grips the blade so that the blade and the tapered portion tend to bend as one part and localization of stress is avoided.

The sleeve 13 is formed with an integral flange 14 which rests on a shoulder 15 in the hub socket and the blade is retained in the hub by a nut 16 engaging the flange 14.

It will be seen that the angular position of the blade 11 in the hub may be adjusted as desired when the aircraft is on the ground by slackening the nut 16, rotating the blade to the desired position, and subsequently tightening up the nut. The steel sleeve adequately reinforces the comparatively soft metal of the blade and provides a sufficiently hard surface for the intense centrifugal and lateral stresses which occur, as is well known, between the root of the blade and the hub socket.

In the alternative construction shown in Figure 5, a sleeve 13 of hard metal is screw-threaded and shrunk on to the root of the blade 11, which is of comparatively soft metal, and the flange 14 of the blade-sleeve 13 rests against the outer end of the hub-socket and is retained by a nut 45 screw-threaded on to the outer surface of the hub-socket.

It is known that, where two stressed metal parts are fitted together, inter-molecular action between the parts gives rise to roughening of the engaging surfaces although there is no relative movement between them. This phenomenon is known as "fretting". In order to prevent fretting between the root of the blade and the surrounding sleeve, the engaging surfaces between these two parts, according to this invention, are coated with a thin layer of a protective substance, before assembly. The protective substance may be oil or some resinous or gummy substance smeared on to the engaging surfaces. Alternatively, the surfaces may be electro-plated with a very thin layer, of the order of a few ten-thousandths of an inch thick, of soft metal such as copper or tin. Such a layer of material between the sleeve 13 and the root of the blade 11 is shown as 46 in Figure 1a and prevents fretting between these two parts.

In the modified construction shown in Figure 3, which shows only a part of the root of a soft metal blade 11, the steel sleeve 13 for the blade is expanded by heat and screw-threaded on to the blade so that when the parts are cold it engages the blade by a shrink fit, and an intermediate layer 46 of softer material as shown by Fig. 1a is provided as in the example already described. A flanged ring 18 is screw-threaded on to the outer surface of the sleeve 13 by means of a nut portion 27 to form an abutment surface for one of the races 47 of a roller bearing having rollers 19. The other race 48 of the bearing abuts against a flanged ring 20 screw-threaded into the hub-socket 10.

The flanged ring 18 has an inward cylindrical extension 21 which forms a bearing with a co-operating face 22 on the inside of the hub. At a point near its outer end, the steel sleeve 13 has a cylindrical face 23 which forms another bearing with an outward cylindrical extension 24 of the flanged ring 20. Rings 25 and 26 are provided to prevent the escape of oil from the mechanism; in addition the sleeve 13 carries a sealing ring 50 to prevent leakage of oil from the roller bearing.

The construction described with reference to Figure 3 is a variable-pitch airscrew in which the pitch of the blades may be varied while the airscrew is rotating, for example, during flight of the aircraft. The sleeve 13 or the nut-portion 27 is connected in known manner to the pitch-varying mechanism which forms no part of the present invention. The rollers 19 take centrifugal loads, and, at the same time, permit rotation of the blade in the hub-socket. The bearings between the parts 21 and 22 and the parts 23 and 24 take loads transverse to the blade axis.

In the construction of Figure 3, the flange 18 is detachable at any time from the sleeve 13 so that the bearing assembly or the blade assembly may be replaced separately, as necessary. In the alternative arrangement illustrated in Figure 4, the flange 18 itself constitutes one race for the thrust rollers 19 and is extended inwardly as at 42 to constitute the inner race of a roller bearing 43. The other race 48 and the sealing ring 50 are provided as in Figure 3; also, the blade 11 is of soft metal and the sleeve 13 is of steel.

We claim:
1. A reinforced airscrew blade comprising a cylindrical root-portion of comparatively soft metal, an external screw-thread formed on said root-portion, a sleeve of harder metal to surround and reinforce said root-portion, a screw-thread formed on the internal surface of said sleeve and engaging, by a shrink-fit over its entire length, with the screw-thread on the said root-portion.

2. An airscrew blade of magnesium alloy having a cylindrical steel sleeve shrunk on to its root-end so as to engage it tightly over the whole length of the sleeve, and a screw-threaded connection between the sleeve and the root-end of the blade.

3. A reinforced airscrew blade comprising a cylindrical root-portion of comparatively soft metal, an external screw-thread of V-shaped profile formed on said root-portion, a cylindrical sleeve of harder metal to surround and reinforce said root-portion, a screw-thread of V-shaped profile formed on the internal surface of said sleeve and engaging, by a shrink fit over the entire length of the screw-thread, with the screw-thread on the root-portion of the blade.

4. A reinforced airscrew blade of comparatively soft metal having a cylindrical root-portion, a sleeve of harder metal engaging, by a shrink-fit along the whole of its length, with said root-portion, and interengaging screw-threads between the sleeve and the root-portion of the blade, wherein the metal sleeve is immovable with respect to the blade.

ALFRED HUBERT ROY FEDDEN.
FRANK MORGAN OWNER.